(12) United States Patent
Ling et al.

(10) Patent No.: US 11,386,043 B2
(45) Date of Patent: Jul. 12, 2022

(54) METHOD, DEVICE, AND COMPUTER PROGRAM PRODUCT FOR MANAGING SNAPSHOT IN APPLICATION ENVIRONMENT

(71) Applicant: EMC IP Holding Company LLC, Hopkinton, MA (US)

(72) Inventors: Qinghua Ling, Beijing (CN); Xin Zhong, Beijing (CN); Yue Yang, Beijing (CN); Yan Shao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 192 days.

(21) Appl. No.: 16/846,842

(22) Filed: Apr. 13, 2020

(65) Prior Publication Data

US 2021/0034570 A1 Feb. 4, 2021

(30) Foreign Application Priority Data

Jul. 30, 2019 (CN) .......................... 201910696586.2

(51) Int. Cl.
*G06F 16/11* (2019.01)
*G06F 16/182* (2019.01)
(Continued)

(52) U.S. Cl.
CPC ........ *G06F 16/128* (2019.01); *G06F 11/1451* (2013.01); *G06F 11/1461* (2013.01);
(Continued)

(58) Field of Classification Search
CPC ............... G06F 16/128; G06F 11/1451; G06F 11/1461; G06F 11/1464; G06F 11/1469; G06F 16/1734; G06F 16/182; G06F 11/1438; G06F 2201/84; G06F 11/1415; G06F 11/1443
(Continued)

(56) References Cited

U.S. PATENT DOCUMENTS 6,434,628 B1 * 8/2002 Bowman-Amuah ... H04L 29/06
714/1
7,769,722 B1 8/2010 Bergant et al.
(Continued)

*Primary Examiner* — Yair Leibovich
(74) *Attorney, Agent, or Firm* — BainwoodHuang

(57) ABSTRACT

Techniques manage snapshots in an application environment. The application environment includes a first application system and a second application system. A group of snapshots of the first application system are identified in a fracture state where synchronous communication between the first application system and the second application system is paused. A group of snapshot differences between two successive snapshots in the group of snapshots are obtained, the group of snapshots being arranged in chronological order that the group of snapshots are generated. The group of snapshot differences are transmitted from the first application system to the second application system in response to determining the synchronous communication between the first application system and the second application system is resumed. Accordingly, snapshots in the application environment can be managed more effectively, and further data synchronization between the first application system and the second application system may be realized.

20 Claims, 10 Drawing Sheets

(51) Int. Cl.
*G06F 16/17* (2019.01)
*G06F 11/14* (2006.01)

(52) U.S. Cl.
CPC ...... *G06F 11/1464* (2013.01); *G06F 11/1469* (2013.01); *G06F 16/1734* (2019.01); *G06F 16/182* (2019.01); *G06F 11/1438* (2013.01)

(58) Field of Classification Search
USPC .......................................................... 714/15
See application file for complete search history.

(56) References Cited

U.S. PATENT DOCUMENTS

| | | |
|---|---|---|
| 8,706,833 B1 | 4/2014 | Bergant et al. |
| 9,063,994 B1 | 6/2015 | Natanzon et al. |
| 9,135,120 B1 | 9/2015 | Natanzon |
| 9,575,851 B1 | 2/2017 | Natanzon et al. |
| 9,575,857 B1 | 2/2017 | Natanzon |
| 9,619,255 B1 | 4/2017 | Natanzon |
| 9,619,256 B1 | 4/2017 | Natanzon et al. |
| 9,619,264 B1 | 4/2017 | Natanzon et al. |
| 9,639,383 B1 | 5/2017 | Natanzon |
| 9,658,929 B1 | 5/2017 | Natanzon et al. |
| 9,659,074 B1 | 5/2017 | Natanzon et al. |
| 9,811,431 B1 | 11/2017 | Natanzon et al. |
| 9,881,014 B1 | 1/2018 | Bono et al. |
| 9,934,302 B1 | 4/2018 | Cohen et al. |
| 9,965,306 B1 | 5/2018 | Natanzon et al. |
| 10,185,583 B1 | 1/2019 | Natanzon et al. |
| 10,191,677 B1 | 1/2019 | Natanzon et al. |
| 10,191,755 B1 | 1/2019 | Natanzon et al. |
| 2018/0260125 A1* | 9/2018 | Botes ...................... G06F 3/065 |

\* cited by examiner

METHOD, DEVICE, AND COMPUTER PROGRAM PRODUCT FOR MANAGING SNAPSHOT IN APPLICATION ENVIRONMENT

CROSS-REFERENCE TO RELATED APPLICATION

This application claims priority to Chinese Patent Application No. CN201910696586.2, on file at the China National Intellectual Property Administration (CNIPA), having a filing date of Jul. 30, 2019, and having "METHOD, DEVICE, AND COMPUTER PROGRAM PRODUCT FOR MANAGING SNAPSHOT IN APPLICATION ENVIRONMENT" as a title, the contents and teachings of which are herein incorporated by reference in their entirety.

FIELD

Various implementations of the present disclosure relate to application systems, and more specifically, to a method, device and computer program product for managing snapshots in an application environment.

BACKGROUND

With the development of computer technology, various application systems now provide users with increasingly large data storage capacities, and their data access speed is also greatly accelerated. As the data storage capacity increases, users put forward higher demands on the data reliability. Technical solutions for serving users based on multiple application systems have been developed, in which one application system may be in active state, while another application system may be in standby state so as to replace the application system in active state when it fails or has a higher workload.

In order to guarantee the availability and reliability of an application system, data synchronization is required among multiple application systems. In this regard, how to perform data synchronization with higher efficiency becomes a focus of research.

SUMMARY

Therefore, it is desirable to develop and implement a technical solution for managing snapshots more effectively. It is desired that the technical solution can be compatible with an existing application system and manage snapshots more effectively by reconstructing configurations of the existing application system.

According to a first aspect of the present disclosure, there is provided a method for managing snapshots in an application environment, the application environment including a first application system and a second application system. In the method, a group of snapshots of the first application system are identified in a fracture state that synchronous communication between the first application system and the second application system is paused. A group of snapshot differences between two successive snapshots in the group of snapshots are obtained, the group of snapshots being arranged in chronological order that the group of snapshots are generated. The group of snapshot differences are transmitted from the first application system to the second application system in response to determining the synchronous communication between the first application system and the second application system is resumed.

According to a second aspect of the present disclosure, there is provided a device for managing snapshots in an application environment, the application environment including a first application system and a second application system. The device includes: at least one processor; a volatile memory; and a memory coupled to the at least one processor, the memory having instructions stored thereon, the instructions, when executed by the at least one processor, causing the device to perform acts. The acts include: identifying a group of snapshots of the first application system in a fracture state that synchronous communication between the first application system and the second application system is paused; obtaining a group of snapshot differences between two successive snapshots in the group of snapshots, the group of snapshots being arranged in chronological order that the group of snapshots are generated; and transmitting the group of snapshot differences from the first application system to the second application system in response to determining the synchronous communication between the first application system and the second application system is resumed.

According to a third aspect of the present disclosure, there is provided a computer program product. The computer program product is tangibly stored on a non-transient computer readable medium and includes machine executable instructions which are used to implement a method according to the first aspect of the present disclosure.

BRIEF DESCRIPTION OF THE DRAWINGS

Through the more detailed description in the accompanying drawings, features, advantages and other aspects of the implementations of the present disclosure will become more apparent. Several implementations of the present disclosure are illustrated schematically and are not intended to limit the present invention. In the drawings.

DETAILED DESCRIPTION OF IMPLEMENTATIONS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred implementations of the present disclosure will be described in more details with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can include other explicit and implicit definitions.

Figure 1:
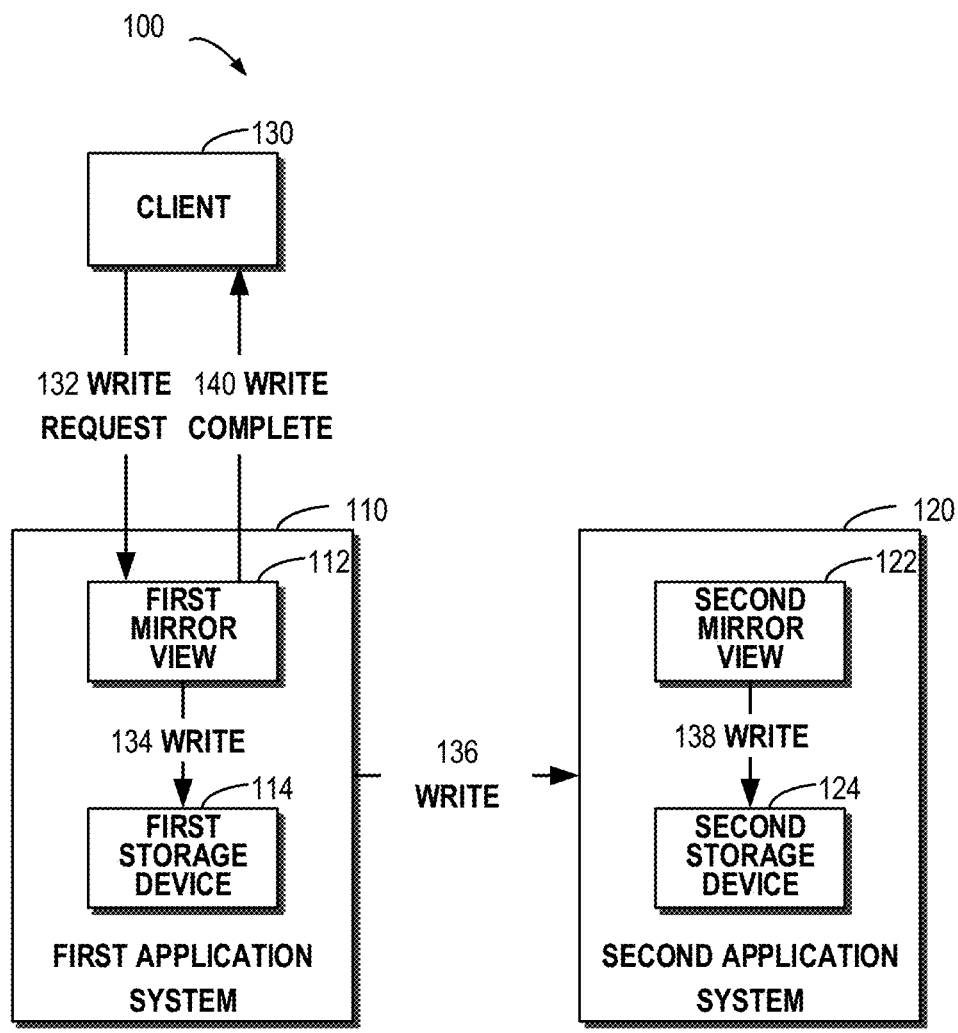
FIG. 1 shows a schematic view of an application environment in which example implementations of the present disclosure may be implemented.

First of all, description is presented below to an application environment of the present disclosure with reference to FIG. 1. This figure shows a schematic view 100 of an application environment in which example implementations of the present disclosure may be implemented. As shown, the application environment 100 may include a first application system 110 and a second application system 120. Here the application systems 110 and 120 may be used to provide various services, including but not limited to, data storage service, data processing service and/or a combination thereof. In FIG. 1, the first application system 110, as an active application system, is used to provide a service interface to a client 130. The second application system 120, as a standby application system, may be activated promptly and used to serve a request from the client 130, when the first application system 110 fails.

As shown in FIG. 1, the first application system 110 may include a first mirror view 112. Here the first mirror view 112 may represent a logical view of a first storage system 114. The client 130 may access the first mirror view 112 without caring about data storage in the first storage system 114. The client 130 may send 132 a write request to the first application system 110. After receiving the write request, the first application system 110 may write 134 data to an underlying first storage device 114.

To guarantee the reliability of the application environment 100, data may be synchronized between the first application system 110 and the second application system 120. Besides writing data to the first storage device 114, the first application system 110 may further write 136 data to the second application system 120 via synchronous communication. Like the first application system 110, the second application system 120 may include a second mirror view 122, and the second mirror view 122 may represent a logical view of a second storage system 124. Where data has been synchronized between the two application systems, the first mirror view 112 and the second mirror view 122 are the same.

Figure 2:
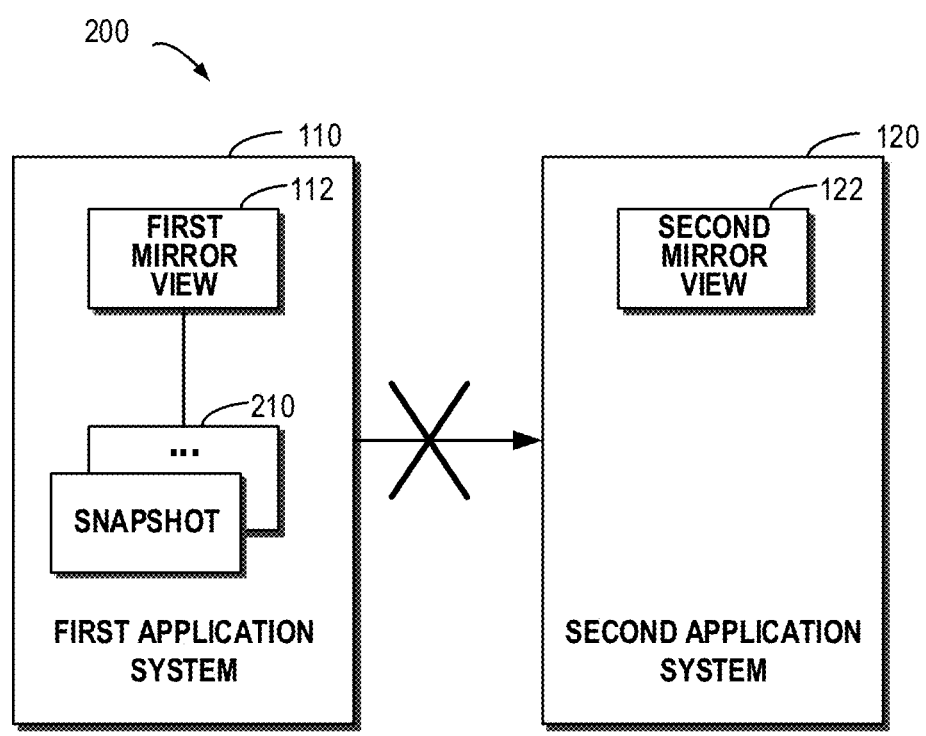
FIG. 2 schematically shows a block diagram of a fracture state that synchronous communication between a first application system and a second application system is paused.

However, the first application system 110 and the second application system 120 are not always synchronous with each other, but synchronous communication between the two application systems might be paused. FIG. 2 schematically shows a block diagram 200 of fracture state that synchronous communication between the first application system 110 and the second application system 120 is paused. A couple of reasons might cause fracture state. For example, the synchronous communication between the first application system 110 and the second application system 120 maybe paused by the application system administrator for equipment maintenance or other purposes. For another example, the synchronous communication between the first application system 110 and the second application system 120 might be paused by network failure.

During the running of the first application system 110, one or more snapshots 210 may be taken for data in the first application system 110. A technical solution has been provided for resuming the synchronization between the first application system 110 and the second application system 120 after the synchronous communication is recovered. However, such synchronization cannot guarantee snapshots generated under fracture state of the first application system 110 are synchronized to the second application system 120. Specifically, since the technical solution wraps the snapshot creation operation into an IO (input/output) request, when the communication between the first application system 110 and the second application system 120 is fractured, the IO request cannot be transmitted between the two application systems, and further the one or more snapshots 210 cannot be synchronized to the second application system 120.

To solve the above drawbacks, implementations of the present disclosure provide a method, device and computer program product for managing snapshots in the application environment 100. According to example implementations of the present disclosure, when an application system enters fracture state, a group of snapshots created at various time points under the fracture state may be identified. Differences between two successive snapshots in the group of snapshots may be determined, and further data may be synchronized from the first application system 110 to the second application system 120 based on the determined differences.

With example implementations of the present disclosure, while the first application system 110 is in fracture state, specific content of each snapshot may be determined. After the synchronous communication between the first application system 110 and the second application system 120 is recovered, relevant data may be transmitted to the second application system 120, so that a snapshot corresponding to a snapshot in the first application system 110 may be obtained at the second application system 120.

Figure 3:
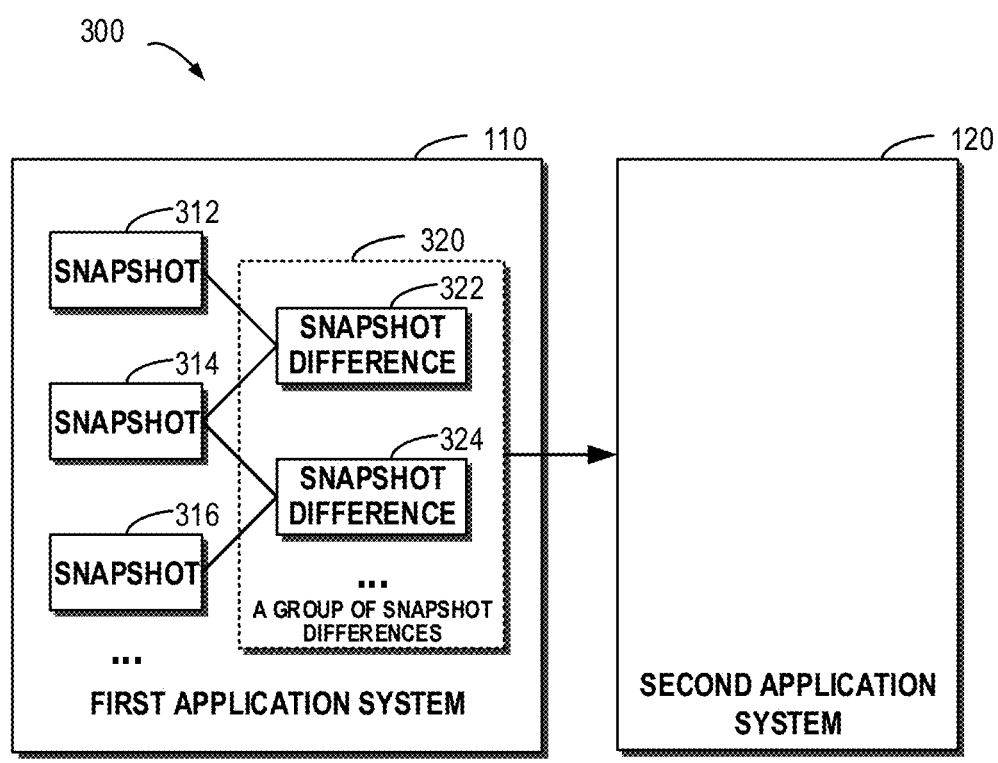
FIG. 3 schematically shows a block diagram for managing snapshots in an application environment according to example implementations of the present disclosure.

More details on how to manage snapshots will be described with reference to FIG. 3 below. This figure schematically shows a block diagram for managing snapshots in the application environment 100 according to example implementations of the present disclosure. As shown, while the first application system 110 is in the fracture state, a group of snapshots of the first application system 110 may be identified, e.g. a snapshot 312, a snapshot 314, a snapshot 316, etc. A group of snapshot differences 320 between two successive snapshots in the group of snapshots may be determined: a snapshot difference 322 between the snapshots 312 and 314, a snapshot difference 324 between the snapshots 314 and 316. Subsequently, the snapshot differences may be transmitted to the second application system 120, so that a group of snapshots corresponding to the snapshots 314 and 316 in the first application system 110 may be generated at the second application system 120.

Figure 4:
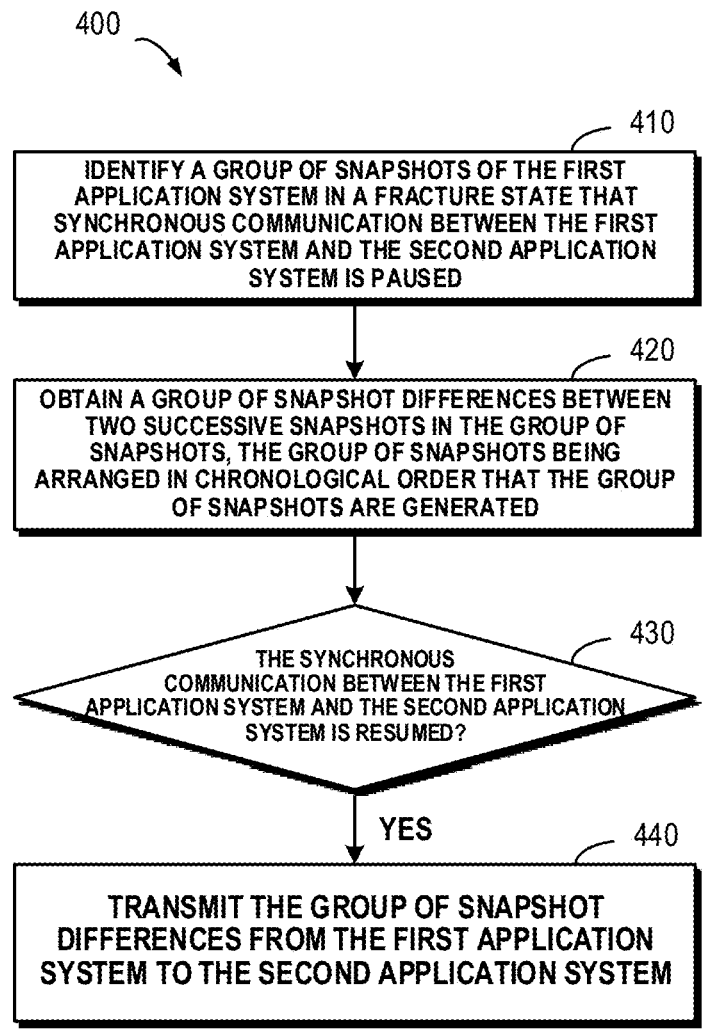
FIG. 4 schematically shows a flowchart of a method for managing snapshots in an application environment according to example implementations of the present disclosure.

More details on how to manage snapshots will be described with reference to FIG. 4 below. This figure schematically shows a flowchart of a method 400 for managing snapshots in the application environment 100 according to example implementations of the present disclosure. At block 410, in fracture state that the synchronous communication between the first application system 110 and the second application system 120 is paused, a group of snapshots of the first application system 110 are identified. It will be understood where the synchronous communication between the first application system 110 and the second application system 120 is normal, snapshots may be synchronized to the second application system 120 based on an existing technical solution. Therefore, the method 400 may be started upon detecting the synchronous communication between the first application system 110 and the second application system 120 is paused and fractured.

More details about various possible states of an application system will be described with reference to FIG. 5 below. This figure schematically shows a block diagram 500 of state transition of an application system according to one implementation of the present disclosure. As shown, the first application system 110 may involve multiple states: an in-sync state 510, an admin fracture state 520, a system fracture state 530, a synchronizing state 540 as well as a sync queue state 550.

The in-sync state 510 means the first application system 110 is in sync with the second application system 120. The admin fracture state 520 means the administrator pauses the synchronous communication between the first application system 110 and the second application system 120. The system fracture state 530 means the synchronous communication between the first application system 110 and the second application system 120 is paused for network reasons. The synchronizing state 540 means synchronization from the first application system 110 to the second application system 120 is underway. The sync queue state 550 means the first application system 110 is queuing for synchronization with the second application system 120.

Figure 5:
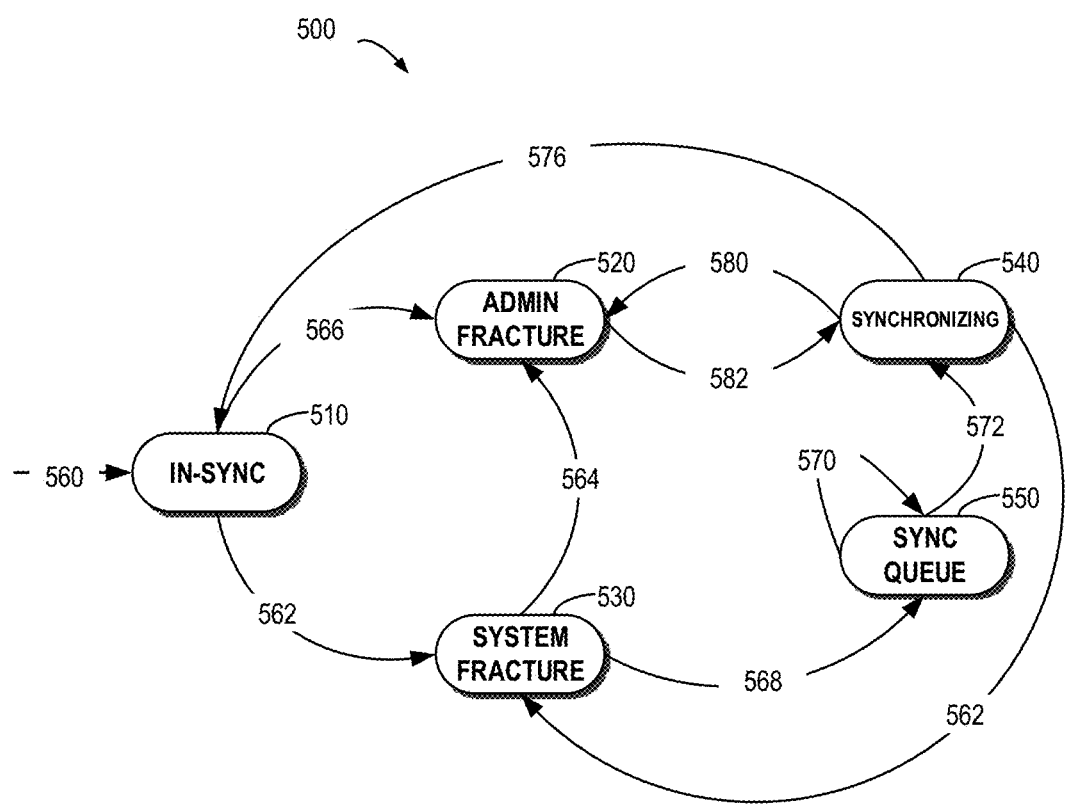
FIG. 5 schematically shows a block diagram of state transition of an application system according to one implementation of the present disclosure.

The various states shown in FIG. 5 may transition based on different events. For example, when an event 566 such as an administrator action, media failure and so on occurs, the in-sync state 510 will transition to the admin fracture state 520. When an event 562 indicative of network failure such as an unreachable message/unreachable notification occurs, the in-sync state 510 will transition to the system fracture state 530. When an administrator action 564 occurs, the system fracture state 530 will transition to the admin fracture state 520. When a scheduling event 568 occurs, the system fracture state 530 will transition to the sync queue state 550.

Under the sync queue state 550, it may be checked 570 continuously whether the scheduling gets ready, and when it is determined 572 the scheduling gets ready, the sync queue state 550 will transition to the synchronizing state 540. If the synchronization is completed 576, then the synchronizing state 540 will transition to the in-sync state 510. If the event 562 such as network failure occurs, then the synchronizing state 540 will transition to the system fracture state 530. Under the synchronizing state 540, if an admin pause action 580 occurs, then the synchronizing state 540 may transition to the admin fracture state 520. If the admin start action 582 occurs, then the admin fracture state 520 may transition to the synchronizing state 540. In the context of the present disclosure, the method 400 may be performed in the admin fracture state 520 or the system fracture state 530 as shown in FIG. 5, so that a group of snapshots generated under the fracture state may be synchronized to the second application system 120 after the synchronous communication between the first application system 110 and the second application system 120 is resumed.

It will be understood since the group of snapshots are generated in chronological order, a snapshot which has been transmitted to the second application system 120 before the first application system 110 enters fracture state needs to be determined, so as to act as a basis for transmitting snapshots from the first application system 110 to the second application system 120. Specifically, the latest-version base snapshot which has been transmitted from the first application system 110 to the second application system 120 may be identified (i.e. a snapshot with the latest generation time at the second application system 120 may act as the base snapshot).

As time elapses, one or more snapshots may be created while the first application system 110 is in fracture state. At this point, the at least one snapshot which is created while the first application system 110 is in fracture state may be identified, so as to determine data associated with which snapshots needs to be transmitted to the second application system 120. Each of the first application system 110 and the second application system 120 includes the base snapshot. Thus at the first application system 110, a portion which has not been transmitted to the second application system 120 may be determined based on the base snapshot, and further snapshots may be managed based on increments among multiple snapshots.

At block 420, a group of snapshot differences between two successive snapshots in the group of snapshots are obtained, here the group of snapshots being arranged in chronological order the group of snapshots are generated. During the running of the application system, a group of snapshots may be generated in chronological order. At this point, snapshot differences between two successive snapshots may be obtained. Returning to FIG. 3, the group of snapshots may include the snapshots 312, 314 and 316, and then at this point, it may be determined a difference between the snapshots 312 and 314 is a snapshot difference 322, and a difference between the snapshots 314 and 316 is a snapshot difference 324.

It will be understood since the application system may include a large amount of data, in order to increase the data management efficiency, a bitmap may further be provided to indicate a modified data block in the application system, so that data in which data blocks are to be transmitted from the first application system 110 to the second application system 120 during data synchronization. According to example implementations of the present disclosure, while the first application system 110 is in the fracture state, in response to determining at least one data block in the first application system 110 is changed, the bitmap in the first application system 110 is updated so as to indicate the at least one changed data block.

Figure 6:
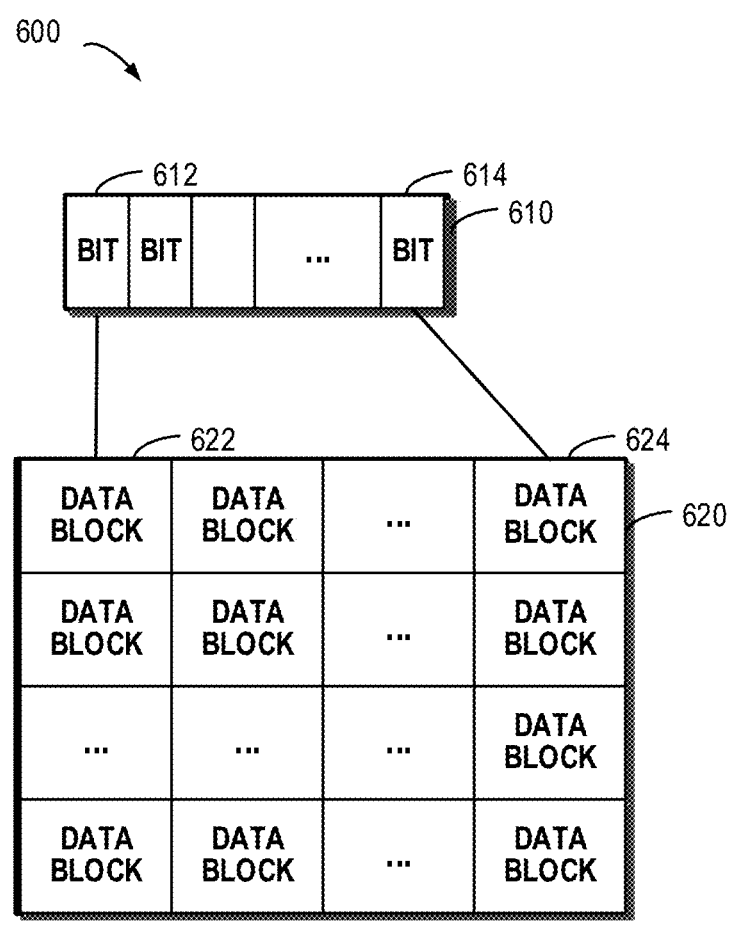
FIG. 6 schematically shows a block diagram of a bitmap of an application system according to one implementation of the present disclosure.

FIG. 6 schematically shows a block diagram 600 of a bitmap in an application system according to one implementation of the present disclosure. In the figure, a reference numeral 610 denotes a bitmap for a group of data blocks 620 in the application system, wherein each bit in the bitmap corresponds to one data block in the group of data blocks 620, indicating whether data in the data block is modified or not. According to example implementations of the present disclosure, the size of a data block may be set based on configuration of the application system. Suppose the application system includes massive data, then at this point larger values may be set to data blocks. Further, a data block may be divided into data sub-blocks so as to increase the granularity of indication. Suppose the application system includes less data, then smaller values may be set to data blocks.

According to example implementations of the present disclosure, for example, "0" may be used to indicate data in a data block is not modified, and "1" may be used to indicate data in a data block is already modified. As shown in FIG. 6, a bit 612 may correspond to a data block 622, . . . , and a bit 614 may correspond to a data block 624. For example, if the bit 612 has a value "0," this means data in the data block 622 is not modified; if the bit 614 has a value "1," this means data in the data block 624 is already modified.

More details on how to determine snapshot differences will be described with reference to FIG. 7 below. This figure schematically shows a block diagram 700 of determining differences between snapshots in a group of snapshots according to example implementations of the present disclosure. As shown, a bitmap 710 denotes a bitmap for a group of data blocks in the first application system 110, wherein a value "0" indicates data in a data block is not modified, and "1" indicates data in a corresponding data block is already modified. Suppose there only exist the snapshots 312 and 314, then at this point the snapshot difference 322 between these two snapshots may be determined based on an index of a storage system (e.g. file systems) in the application system 110. The snapshot difference 322 only involves a portion associated with a second data block in the two snapshots 312 and 314.

At block 430, it is determined whether synchronous communication between the first application system 110 and the second application system 120 is resumed or not. It will be understood since the snapshot differences are transmitted to the second application system 120 only after the synchronous communication between the two application systems is resumed, it may be detected periodically whether the synchronous communication is resumed or not. According to example implementations of the present disclosure, whether the synchronous communication is resumed may be determined based on a notification of link recovery. According to example implementations of the present disclosure, it may further be determined the synchronous communication has been resumed, based on the administrator triggering a recovery command.

At block 440, if the synchronous communication has been resumed, the group of snapshot differences 320 is transmitted from the first application system 110 to the second application system 120. According to example implementations of the present disclosure, in order to transmit the group of snapshot differences 320 from the first application system 110 to the second application system 120, each snapshot differences in the group of snapshot differences 320 may be transmitted from the first application system 110 to the second application system 120 in chronological order the group of snapshots are generated. It will be understood since the snapshot difference is a difference between two chronologically successive snapshots, by transmitting snapshots to the second application system 120 one after another in chronological order, the second application system 120 may receive a snapshot difference corresponding to each snapshot at the first application system 110 in a cumulative way.

According to example implementations of the present disclosure, in order to guarantee the second application system 120 has enough available space to accommodate the group of snapshot differences 320, a write request may further be sent to the second application system 120 so as to indicate storage space needed by the group of snapshots. If the second application system 120 has enough storage space, then the group of snapshot differences may be directly transmitted to the second application system 120. If there is a shortage of available space in the second application system 120, then new storage space in the second application system 120 may be requested, or storage space which is no longer used may be released so as to accommodate the group of snapshot differences.

According to example implementations of the present disclosure, the second application system 120 may be notified to generate a group of snapshots corresponding to the group of snapshots based on the received group of snapshot differences. Specifically, where the second application system 120 has received a snapshot difference, the second application system 120 may generate a corresponding snapshot based on the received snapshot difference. In the example of FIG. 7, while the synchronous communication between the first application system 110 and the second application system 120 is normal, the snapshot 312 has been transmitted to the second application system 120. Thus, the snapshot 312 is a base snapshot, and a mirror snapshot may be generated at the second application system 120 based on the received snapshot difference 322 and the snapshot 312 at the second application system 120.

Figure 7:
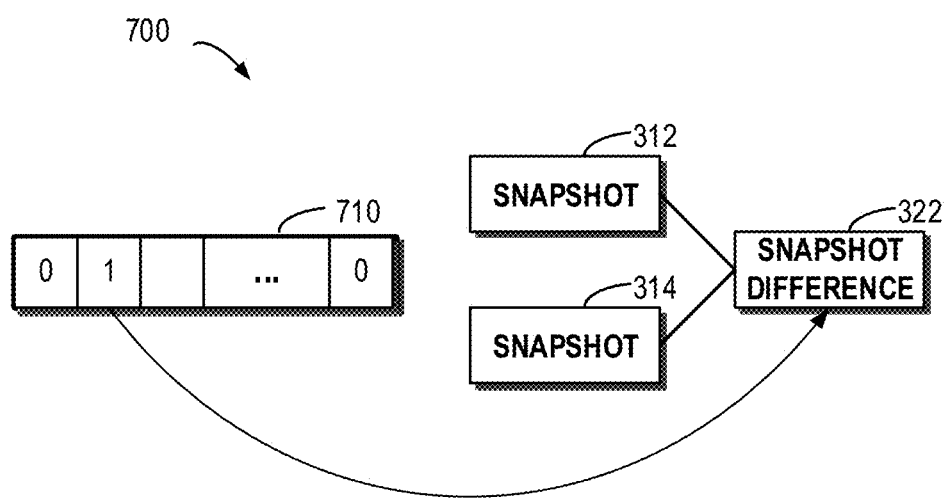
FIG. 7 schematically shows a block diagram of determining a difference between snapshots in a group of snapshots according to example implementations of the present disclosure.

It will be understood although FIG. 7 shows the circumstance where there are two snapshots, according to example implementations of the present disclosure, the group of snapshots may include more snapshots. Two successive snapshots may be processed in a similar way to the above, so that a snapshot difference between two snapshots may be generated. Further, each snapshot difference among multiple snapshot differences may be transmitted to the second application system 120 one after another, and a corresponding mirror snapshot may be generated at the second application system based on each snapshot difference and a corresponding base snapshot. For example, suppose there exists further snapshot difference besides the snapshot difference 322, then a mirror snapshot generated based on the snapshot difference 322 and the snapshot 312 may act as a new base snapshot at the second application system 120. Next, a mirror snapshot corresponding to the further snapshot difference may be generated based on the new base snapshot and the further snapshot difference.

According to example implementations of the present disclosure, a second mirror view in the second application system 120 may be updated based on the snapshot difference, so as to realize the synchronization between the first application system 110 and the second application system 120. Specifically, in response to determining the group of snapshot differences are already transmitted from the first application system to the second application system 120, a system snapshot of the first application system 110 may be generated at the first application system; and a difference between the system snapshot and a snapshot with the latest creation time in the group of snapshots may be transmitted to the second application system 120.

It will be understood the system snapshot here is not a snapshot which is generated based on a user's demand for snapshot taking, but a snapshot which is generated for realizing the synchronization between the second application system 120 and the first application system 110. If data in the application system 110 is not modified between two time points of generating the latest snapshot and completing the transmission, then the latest snapshot reflects the latest state of the application system 110, so there is no need to generate a system snapshot specially.

According to example implementations of the present disclosure, the second application system 120 may be notified to update the second mirror view 122 in the second application system 120 based on the received group of snapshot differences, the second mirror view 122 being a mirror of the first application system 110. In this way, the group of snapshot differences may be not only used to generate corresponding snapshots at the second application system 120, but also reused so as to generate a mirror of the first application system at the second application system 120. In this way, there is no need to retransmit all data in the first application system 110, but only a difference between the latest-version snapshot in the first application system 110 and current data in the first application system 110 needs to be transmitted.

More details about managing snapshots will be described with reference to FIG. 8 below. This figure schematically shows a block diagram 800 of creating snapshots in the second application system 120 based on a group of snapshot differences according to example implementations of the present disclosure. On the left there are shown a group of data blocks 810 at the first application system 110, and on the right there are shown a group of data blocks 820 at the second application system 120. Suppose at the first application system 110 there are 8 data blocks B0 to B7, and the synchronous communication between the first application system 110 and the second application system 120 is in normal state at the time point T0. At this point, data in the data blocks B0 to B7 at the first application system 110 are the same as data in data blocks B0 to B7 at the second application system 120.

Suppose the synchronous communication between the first application system 110 and the second application system 120 is fractured after the time point T0. Further, suppose data in the data block B1 at the first application system 110 is modified at the time point T1, data in the data block B2 at the first application system 110 is modified at the time point T2, data in the data block B3 at the first application system 110 is modified at the time point T3, and three snapshots are taken at the time points T1, T2 and T3 respectively.

The above method 400 may be performed. A snapshot of data in the first application system 110 at the time point T0 may serve as a base snapshot, and snapshot differences between every two successive snapshots may be determined based on the base snapshot and the three subsequent snapshots. At this point, three snapshot differences involve the data blocks B1, B2 and B3. If it is detected the synchronous communication between the first application system 110 and the second application system 120 is resumed, the three snapshot differences (i.e. the data blocks B1, B2 and B3) may be transmitted from the first application system 110 to the second application system 120. After receiving the various data blocks, the second application system 120 may generate corresponding snapshots based on the data blocks B1, B2 and B3, and update data in the data blocks B1, B2 and B3 into corresponding data blocks B1, B2 and B3 at the second application system 120.

Figure 8:
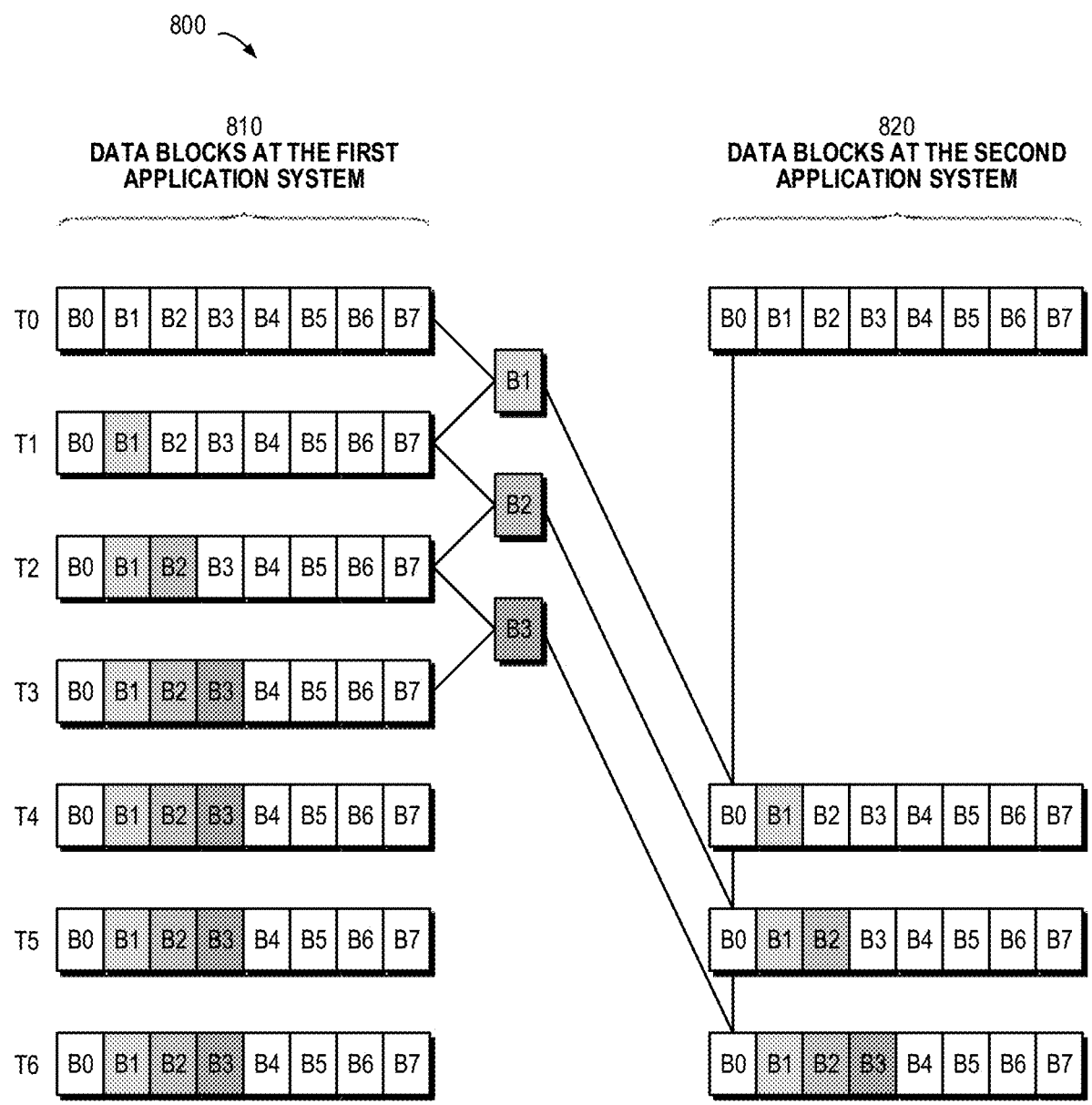
FIG. 8 schematically shows a block diagram of creating a snapshot in a second application system based on a group of snapshot differences according to example implementations of the present disclosure.

In the example of FIG. 8, no data block in the first application system 110 is updated between the time point T3 of generating the latest snapshot and the time point T6 of completing the transmission, so there is no need to generate a system snapshot. At this moment, a data block at the second application system 110 is synchronous with data in a data block at the first application system 110 at the time point T6. Between T3 and T6, if data in the data block B4 at the first application system is updated, then a system snapshot needs to be taken, and a difference (i.e. the data block B4 at the first application system 110) between the system snapshot and the last snapshot needs to be transmitted to the second application system 120. After receiving data in the data block B4, the second application system 120 may further update data in the data block B4 at the second application system 120 by using the received data. After completion of the update, the second application system 120 becomes synchronous with the first application system 110.

Description has been presented above on how to manage snapshots in the application environment 100. It will be understood with the above method, where the synchronous communication between the first application system 110 and the second application system 120 is resumed, one or more snapshots which are taken when the first application system 110 is in fracture state have been synchronized to the second application system 120, and the second application system 120 becomes synchronous with the first application system 110. It will be understood data needs to be synchronized to the second application system 120 based on the bitmap in the first application system 110 while the synchronous communication between the two application systems operates normally.

Thereby, after the synchronous communication is recovered, it should be guaranteed the bitmap in the first application system 110 can reflect the difference between the first mirror view 112 in the first application system 110 and the second mirror view 122 in the second application system 120. According to example implementations of the present disclosure, the bitmap may be updated based on the snapshot difference which has been transmitted to the second application system 120. More details about updating the bitmap are presented below with reference to FIG. 9.

Figure 9:
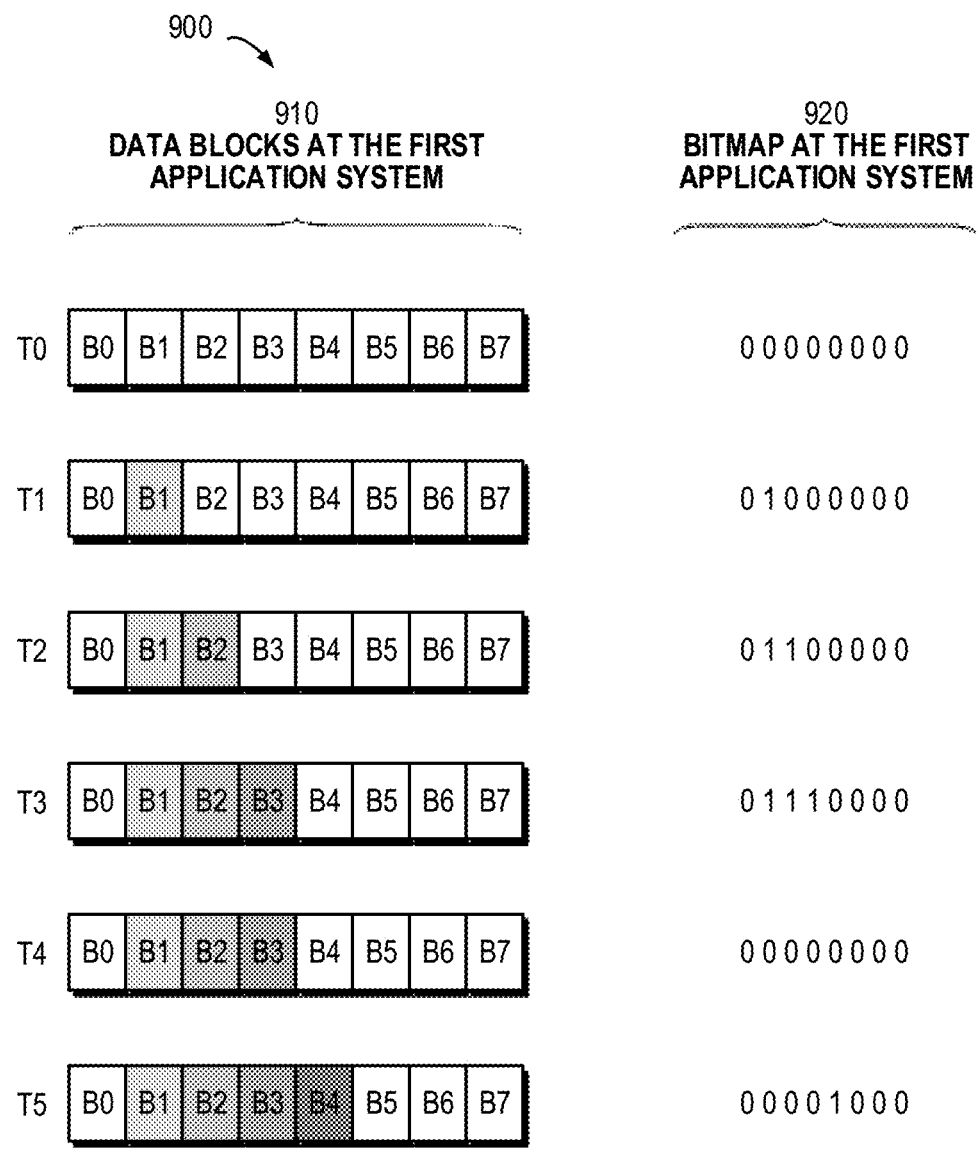
FIG. 9 schematically shows a block diagram of modifying a bitmap of an application system according to example implementations of the present disclosure.

FIG. 9 schematically shows a block diagram 900 of modifying a bitmap in an application system according to example implementations of the present disclosure. On the left there are shown a group of blocks 910 at the first application system 110, and on the right there is shown a bitmap in the first application system 110. Suppose the synchronous communication between the first application system 110 and the second application system 120 is fractured between time points T0 and T3. At the time point T1, the data block B1 in the first application system 110 is modified, so a bit in the bitmap 920 which corresponds to the data block B1 will be modified as "1." At the time point T2, the data block B2 in the first application system 110 is modified, so a bit in the bitmap 920 which corresponds to the data block B2 will be modified as "1." Similarly, a bit in the bitmap 920 which corresponds to the data block B3 will be modified as "1."

Suppose the synchronous communication between the first application system 110 and the second application system 120 is recovered at the time point T4, and after data in the data blocks B1, B2 and B3 is transmitted from the first application system 110 to the second application system 120, the second application system 120 becomes synchronous with the first application system 110. Therefore, portions of the bitmap 920 which are associated with the data blocks B1, B2 and B3 need to be cleared. At this point, the bitmap 920 will be updated to "00000000."

With reference to FIG. 9, detailed description is presented below to operations after the synchronous communication is recovered. Suppose at the next time point T5, data in the data block B4 is modified, then a bit in a bitmap 940 which corresponds to the data block B4 needs to be updated to "1" so as to indicate the modified data block. Next, data may be synchronized from the first application system 110 to the second application system 120 based on the updated bitmap. At this point, only the data block B4 needs to be sent from the first application system 110 to the second application system 120 during data synchronization. After data in the data block B4 is synchronized to the second application system 120, a portion of the bitmap 920 which corresponds to the data block B4 may be cleared.

It will be understood although FIG. 9 does not illustrate the creation of a system snapshot, in real running, a data block in the first application system 110 might be modified in a period from taking the last snapshot to transmitting the group of snapshot differences to the second application system 120. In this case, a system snapshot needs to be made. Since the system snapshot is a snapshot which is created for data synchronization, the system snapshot may be deleted from the first application system 110 after the completion of data synchronization. At this point, the synchronous communication between the first application system 110 and the second application system 120 remains normal. Thus, when a certain data block in the first application system 110 is modified, a bit in the bitmap which corresponds to the modified data block is updated, and the running of a first storage system is restarted based on the updated bitmap.

While examples of the method according to the present disclosure have been described in detail with reference to FIGS. 2 to 9, description is presented below to the implementation of a corresponding apparatus. According to example implementations of the present disclosure, provided is an apparatus for managing snapshots in an application environment, the application environment including a first application system and a second application system. The apparatus includes: an identifying module configured to identify a group of snapshots of the first application system in a fracture state that synchronous communication between the first application system and the second application system is paused; an obtaining module configured to obtain a group of snapshot differences between two successive snapshots in the group of snapshots, the group of snapshots being arranged in chronological order that the group of snapshots are generated; and a transmitting module configured to transmit the group of snapshot differences from the first application system to the second application system in response to determining the synchronous communication between the first application system and the second application system is resumed.

According to example implementations of the present disclosure, the identifying module is further configured to: identify a base snapshot in the latest version which has been transmitted from the first application system to the second application system; and identify at least one snapshot which is created when the first application system is in the fracture state.

According to example implementations of the present disclosure, the transmitting module is further configured to: transmit each snapshot difference in the group of snapshot differences from the first application system to the second application system in chronological order that the group of snapshots are generated.

According to example implementations of the present disclosure, there is further comprised: a notifying module configured to notify the second application system to generate a group of snapshots corresponding to the group of snapshots based on the received group of snapshot snapshots.

According to example implementations of the present disclosure, there is further comprised: a notifying module configured to notify the second application system to update a second mirror view in the second application system based on the received group of snapshot differences, the second mirror view being a mirror of the first application system.

According to example implementations of the present disclosure, there is further comprised: a generating module configured to generate a system snapshot of the first application system in response to determining the group of snapshot differences have been transmitted from the first application system to the second application system; and the transmitting module is further configured to transmit a difference between the system snapshot and a snapshot with the latest creation time in the group of snapshots to the second application system.

According to example implementations of the present disclosure, there is further comprised: an updating module configured to, while the first application system is in the fracture state, in response to determining at least one data block in the first application system is changed, update a bitmap in the first application system so as to indicate the changed at least one data block; and the updating module is further configured to update the bitmap based on a snapshot difference which has been transmitted to the second application system.

According to example implementations of the present disclosure, there are further comprised: a deleting module configured to delete the system snapshot from the first application system; and a managing module configured to manage an operation of the first application system based on the updated bitmap.

According to example implementations of the present disclosure, the managing module is further configured to: in response to determining a data block in the first application system is modified, update the bitmap so as to indicate the modified data block; and synchronize data from the first application system to the second application system based on the updated bitmap.

According to example implementations of the present disclosure, the fracture state includes: either of an administrator fracture state and a system fracture state.

Figure 10:
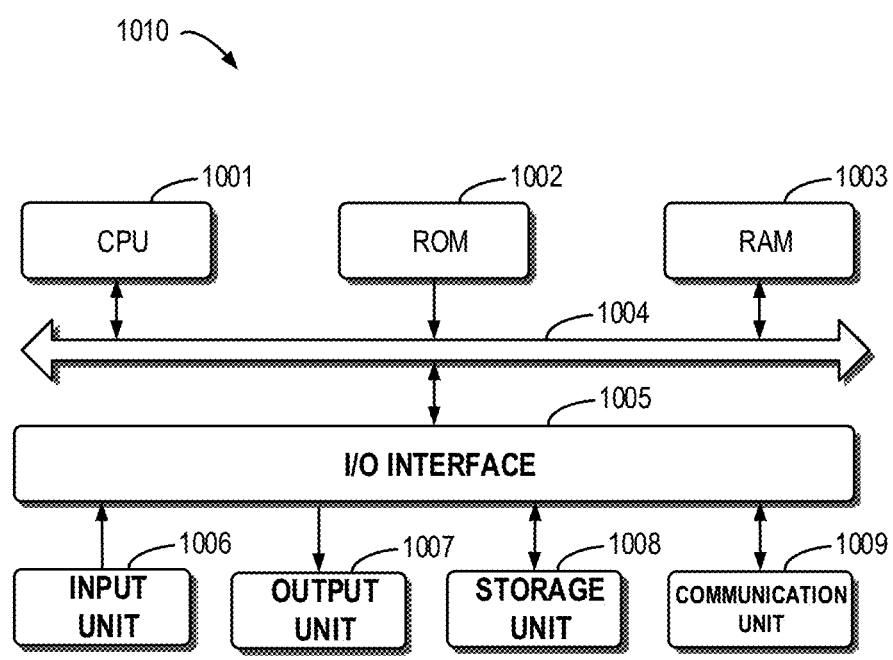
FIG. 10 schematically shows a block diagram of a device for managing snapshots in an application environment according to example implementations of the present disclosure.

FIG. 10 schematically shows a block diagram of a device 1000 for managing snapshots according to example implementations of the present disclosure. As shown, the device 1000 includes a central process unit (CPU) 1001, which can execute various suitable actions and processing based on the computer program instructions stored in the read-only memory (ROM) 1002 or computer program instructions loaded in the random-access memory (RAM) 1003 from a storage unit 1008. The RAM 1003 can also store all kinds of programs and data required by the operations of the device 1000. CPU 1001, ROM 1002 and RAM 1003 are connected to each other via a bus 1004. The input/output (I/O) interface 1005 is also connected to the bus 1004.

A plurality of components in the device 1000 is connected to the I/O interface 1005, including: an input unit 1006, such as keyboard, mouse and the like; an output unit 1007, e.g., various kinds of display and loudspeakers etc.; a storage unit 1008, such as magnetic disk and optical disk etc.; and a communication unit 1009, such as network card, modem, wireless transceiver and the like. The communication unit 1009 allows the device 1000 to exchange information/data with other devices via the computer network, such as Internet, and/or various telecommunication networks.

The above described each process and treatment, such as the method 400 can also be executed by the processing unit 1001. For example, in some implementations, the method 400 can be implemented as a computer software program tangibly included in the machine-readable medium, e.g., the storage unit 1008. In some implementations, the computer program can be partially or fully loaded and/or mounted to the device 1000 via ROM 1002 and/or the communication unit 1009. When the computer program is loaded to the RAM 1003 and executed by the CPU 1001, one or more steps of the above described method 400 can be implemented. Alternatively, in other implementations, the CPU 1001 also can be configured in other suitable manners to realize the above procedure/method.

According to example implementations of the present disclosure, there is provided a device for managing snapshots in an application environment, the application environment including a first application system and a second application system The device includes: at least one processor; a volatile memory; and a memory coupled to the at least one processor, the memory having instructions stored thereon, the instructions, when executed by the at least one processor, causing the device to perform acts. The acts include: identifying a group of snapshots of the first application system in a fracture state that synchronous communication between the first application system and the second application system is paused; obtaining a group of snapshot differences between two successive snapshots in the group of snapshots, the group of snapshots being arranged in chronological order that the group of snapshots are generated; and transmitting the group of snapshot differences from the first application system to the second application system in response to determining the synchronous communication between the first application system and the second application system is resumed.

According to example implementations of the present disclosure, identifying a group of snapshots of the first application system includes: identifying a base snapshot in the latest version which has been transmitted from the first application system to the second application system; and identifying at least one snapshot which is created when the first application system is in the fracture state.

According to example implementations of the present disclosure, transmitting the group of snapshot differences from the first application system to the second application system includes: transmitting each snapshot difference in the group of snapshot differences from the first application system to the second application system in chronological order that the group of snapshots are generated.

According to example implementations of the present disclosure, the acts further include: notifying the second application system to generate a group of snapshots corresponding to the group of snapshots based on the received group of snapshot snapshots.

According to example implementations of the present disclosure, the acts further include: notifying the second application system to update a second mirror view in the second application system based on the received group of snapshot differences, the second mirror view being a mirror of the first application system.

According to example implementations of the present disclosure, the acts further include: generating a system snapshot of the first application system in response to determining the group of snapshot differences have been transmitted from the first application system to the second application system; and transmitting a difference between the system snapshot and a snapshot with the latest creation time in the group of snapshots to the second application system.

According to example implementations of the present disclosure, the acts further include: while the first application system is in the fracture state, in response to determining at least one data block in the first application system is changed, updating a bitmap in the first application system so as to indicate the changed at least one data block; and updating the bitmap based on a snapshot difference which has been transmitted to the second application system.

According to example implementations of the present disclosure, the acts further include: deleting the system snapshot from the first application system; and managing an operation of the first application system based on the updated bitmap.

According to example implementations of the present disclosure, managing the operation of the first application system based on the updated bitmap includes: in response to determining a data block in the first application system is modified, updating the bitmap so as to indicate the modified data block; and synchronizing data from the first application system to the second application system based on the updated bitmap.

According to example implementations of the present disclosure, the fracture state includes: either of an administrator fracture state and a system fracture state.

According to example implementations of the present disclosure, there is provided a computer program product. The computer program product is tangibly stored on a non-transient computer readable medium and includes machine executable instructions which are used to implement the method according to the present disclosure.

According to example implementations of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only by way of example rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable other ordinary skilled in the art to understand implementations of the present disclosure.

We claim:

1. A method for managing snapshots in an application environment, the application environment comprising a first application system and a second application system, the method comprising:
    identifying a group of snapshots of the first application system while the first application system is in a fracture state in which synchronous communication between the first application system and the second application system is paused;
    obtaining a group of snapshot differences between two successive snapshots in the group of snapshots, the group of snapshots being arranged in chronological order according to when the snapshots were generated; and transmitting the group of snapshot differences from the first application system to the second application system in response to determining the synchronous communication between the first application system and the second application system is resumed.

2. The method of claim 1, wherein identifying a group of snapshots of the first application system comprises:

identifying a base snapshot in the latest version which has been transmitted from the first application system to the second application system; and identifying at least one snapshot which is created when the first application system is in the fracture state.

3. The method of claim 2, wherein transmitting the group of snapshot differences from the first application system to the second application system comprises:

transmitting each snapshot difference in the group of snapshot differences from the first application system to the second application system in the chronological order according to when the snapshots were generated.

4. The method of claim 3, further comprising:

notifying the second application system to generate a new group of snapshots corresponding to the identified group of snapshots based on the group of snapshot differences transmitted from the first application system to the second application system.

5. The method of claim 3, further comprising:

notifying the second application system to update a second mirror view in the second application system based on the group of snapshot differences transmitted from the first application system to the second application system, the second mirror view being a mirror of the first application system.

6. The method of claim 5, further comprising:

generating a system snapshot of the first application system in response to determining the group of snapshot differences have been transmitted from the first application system to the second application system; and transmitting a difference between the system snapshot and a snapshot with a latest creation time in the group of snapshots to the second application system.

7. The method of claim 6, further comprising:

while the first application system is in the fracture state, in response to determining at least one data block in the first application system is changed, updating a bitmap in the first application system so as to indicate the changed at least one data block; and updating the bitmap based on a snapshot difference which has been transmitted to the second application system.

8. The method of claim 7, further comprising:

deleting the system snapshot from the first application system; and managing an operation of the first application system based on the updated bitmap.

9. The method of claim 8, wherein managing the operation of the first application system based on the updated bitmap further comprises:

in response to determining a data block in the first application system is modified, updating the bitmap so as to indicate the modified data block; and synchronizing data from the first application system to the second application system based on the updated bitmap.

10. The method of claim 1, wherein the fracture state comprises:

either of an administrator fracture state and a system fracture state.

11. A device for managing snapshots in an application environment, the application environment comprising a first application system and a second application system, the device comprising:

at least one processor;

a volatile memory; and a memory coupled to the at least one processor and having instructions stored thereon, the instructions, when executed by the at least one processor, causing the device to perform acts comprising:

identifying a group of snapshots of the first application system while the first application system is in a fracture state in which synchronous communication between the first application system and the second application system is paused;

obtaining a group of snapshot differences between two successive snapshots in the group of snapshots, the group of snapshots being arranged in chronological order according to when the snapshots were generated; and transmitting the group of snapshot differences from the first application system to the second application system in response to determining the synchronous communication between the first application system and the second application system is resumed.

12. The device of claim 11, wherein identifying a group of snapshots of the first application system comprises:

identifying a base snapshot in the latest version which has been transmitted from the first application system to the second application system; and identifying at least one snapshot which is created when the first application system is in the fracture state.

13. The device of claim 12, wherein transmitting the group of snapshot differences from the first application system to the second application system comprises:

transmitting each snapshot difference in the group of snapshot differences from the first application system to the second application system in the chronological order according to when the snapshots were generated.

14. The device of claim 13, wherein the acts further comprise:

notifying the second application system to generate a new group of snapshots corresponding to the identified group of snapshots based on the received group of snapshot differences transmitted from the first application system to the second application system.

15. The device of claim 13, wherein the acts further comprise:

notifying the second application system to update a second mirror view in the second application system based on the group of snapshot differences transmitted from the first application system to the second application system, the second mirror view being a mirror of the first application system.

16. The device of claim 15, wherein the acts further comprise:

generating a system snapshot of the first application system in response to determining the group of snapshot differences have been transmitted from the first application system to the second application system; and transmitting a difference between the system snapshot and a snapshot with a latest creation time in the group of snapshots to the second application system.

17. The device of claim 16, wherein the acts further comprise:

while the first application system is in the fracture state, in response to determining at least one data block in the first application system is changed, updating a bitmap in the first application system so as to indicate the changed at least one data block; and updating the bitmap based on a snapshot difference which has been transmitted to the second application system.

18. The device of claim 17, wherein the acts further comprise:

deleting the system snapshot from the first application system; and managing an operation of the first application system based on the updated bitmap.

19. The device of claim 18, wherein managing the operation of the first application system based on the updated bitmap further comprises:

in response to determining a data block in the first application system is modified, updating the bitmap so as to indicate the modified data block; and synchronizing data from the first application system to the second application system based on the updated bitmap.

20. A computer program product having a non-transitory computer readable medium which stores a set of instructions to manage snapshots in an application environment, the application environment comprising a first application system and a second application system; the set of instructions, when carried out by computerized circuitry, causing the computerized circuitry to perform a method of:

identifying a group of snapshots of the first application system while the first application system is in a fracture state in which synchronous communication between the first application system and the second application system is paused;

obtaining a group of snapshot differences between two successive snapshots in the group of snapshots, the group of snapshots being arranged in chronological order according to when the snapshots were generated; and transmitting the group of snapshot differences from the first application system to the second application system in response to determining the synchronous communication between the first application system and the second application system is resumed.

* * * * *